United States Patent
Gaiduk (10) Patent No.: US 10,761,311 B2
(45) Date of Patent: Sep. 1, 2020

(54) DIGITAL MICROSCOPE AND METHOD FOR ACQUIRING A STACK OF MICROSCOPIC IMAGES OF A SPECIMEN

(71) Applicant: CARL ZEISS MICROSCOPY GMBH, Jena (DE)

(72) Inventor: Alexander Gaiduk, Jena (DE)

(73) Assignee: CARL ZEISS MICROSCOPY GMBH, Jena (DE)

(*) Notice: Subject to any disclaimer, the term of this patent is extended or adjusted under 35 U.S.C. 154(b) by 0 days.

(21) Appl. No.: 16/156,893

(22) Filed: Oct. 10, 2018

(65) Prior Publication Data

US 2019/0107705 A1    Apr. 11, 2019

(30) Foreign Application Priority Data

Oct. 10, 2017    (DE) .................... 10 2017 123 510

(51) Int. Cl.
| | |
|---|---|
| H04N 7/18 | (2006.01) |
| G02B 21/36 | (2006.01) |
| G02B 21/06 | (2006.01) |
| G02B 21/24 | (2006.01) |
| H04N 5/235 | (2006.01) |
| G02B 21/02 | (2006.01) |
| G02B 21/26 | (2006.01) |

(52) U.S. Cl.
CPC .......... *G02B 21/367* (2013.01); *G02B 21/06* (2013.01); *G02B 21/241* (2013.01); *H04N 5/2351* (2013.01); *H04N 5/2354* (2013.01); *G02B 21/02* (2013.01); *G02B 21/26* (2013.01)

(58) Field of Classification Search
CPC .................................... G02B 21/367
USPC ............................................... 348/79
See application file for complete search history.

(56) References Cited

U.S. PATENT DOCUMENTS

| | | | | |
|---|---|---|---|---|
| 6,055,097 | A  * | 4/2000 | Lanni | ..................... G02B 21/06 |
| | | | | 359/368 |
| 6,344,930 | B1 | 2/2002 | Kaneko | |
| 7,345,816 | B2 | 3/2008 | Ri | |
| 8,212,915 | B1 | 7/2012 | Clark | |
| 8,581,996 | B2 | 11/2013 | Inomata et al. | |
| 2003/0015643 | A1* | 1/2003 | Veith | ........................ G01J 1/32 |
| | | | | 250/205 |

(Continued)

FOREIGN PATENT DOCUMENTS

| | | |
|---|---|---|
| DE | 10 2014 006 717 A1 | 11/2015 |
| EP | 2 687 890 A1 | 1/2014 |

(Continued)

*Primary Examiner* — Leron Beck
(74) *Attorney, Agent, or Firm* — Stuart H. Mayer; Mayer & Williams PC (57) ABSTRACT

The present invention relates firstly to a method for acquiring a stack of microscopic images of a specimen. The microscopic images of the stack are acquired from different focus positions. According to the invention, a plurality of the microscopic images of the specimen are respectively acquired from at least some of the focus positions using different settings of an illumination unit for illuminating the specimen. According to the invention, the illumination settings with which the microscopic images of the specimen are acquired is decided upon individually in each case at least for several of the focus positions. The invention further relates to a digital microscope for microimaging a specimen.

13 Claims, 3 Drawing Sheets

(56) References Cited

U.S. PATENT DOCUMENTS

| | | | |
|---|---|---|---|
| 2004/0257360 A1* | 12/2004 | Sieckmann | G06T 17/05 345/419 |
| 2008/0283722 A1 | 11/2008 | Uchiyama | |
| 2011/0176029 A1* | 7/2011 | Boydston | G01J 3/50 348/223.1 |
| 2012/0120222 A1* | 5/2012 | Lettow | G02B 21/24 348/79 |
| 2012/0120223 A1* | 5/2012 | Zuest | G02B 21/0008 348/79 |
| 2013/0113896 A1* | 5/2013 | Prantl | G01B 11/2513 348/49 |
| 2013/0141562 A1* | 6/2013 | Yano | G01N 21/95607 348/79 |
| 2014/0185462 A1 | 7/2014 | Guo et al. | |
| 2015/0185464 A1 | 7/2015 | Karube et al. | |
| 2015/0185465 A1 | 7/2015 | Karube | |
| 2016/0277675 A1* | 9/2016 | Lee | H04N 5/23229 |
| 2017/0024859 A1* | 1/2017 | Schnitzler | G06T 5/002 |
| 2017/0078549 A1* | 3/2017 | Emtman | H04N 5/2351 |

FOREIGN PATENT DOCUMENTS

| | | |
|---|---|---|
| EP | 2 687 893 A1 | 1/2014 |
| WO | 2005/119331 A1 | 12/2005 |
| WO | 2007/134264 A2 | 11/2007 |

\* cited by examiner

DIGITAL MICROSCOPE AND METHOD FOR ACQUIRING A STACK OF MICROSCOPIC IMAGES OF A SPECIMEN

FIELD

The present invention relates firstly to a method for acquiring a stack of microscopic images of a specimen. The images of the stack are acquired from different focus positions. The invention further relates to a digital microscope for microimaging a specimen.

BACKGROUND

An optical microscope is known from U.S. Pat. No. 7,345,816 B2 that comprises a mirror with a controllably variable reflective surface. By changing the surface of the mirror, images can be taken from different focal positions.

The product "3D Microscope" by the manufacturer SD Optics is used for the rapid generation of macroscopic and microscopic images having an extended depth of field (EDoF). In order to achieve the EDoF functionality, a mirror array lens system called a MALS module is used. MALS stands for Mirror Array Lens System. Details of this system are disclosed in WO 2005/119331 A1 or WO 2007/134264 A2, for example.

EP 2 687 890 A1 describes a device and a method for compressing stacks of microscopic images.

A method for improving the depth of field in microscopy is known from EP 2 687 893 A1. An image stack with different focus settings, which can also be called a z-stack, is captured as a sequence. The images of the stack are superimposed in order to obtain an image with an extended depth of focus.

DE 10 2014 006 717 A1 describes a method for generating three-dimensional information for an object in a digital microscope. In this method, an image is taken for each focus position and stored with the associated focus position in an image stack. An EDoF image is calculated from the acquired images of the image stack. During the process of calculating the EDoF image, a number of pixel defects are detected, which are corrected by interpolation with neighboring pixels. The corrected EDoF image is used to calculate a height map or 3D model of the object.

Taking the prior art as a point of departure, it is the object of the present invention to minimize the drawbacks of unadapted illumination of a specimen when acquiring a stack of microscopic images with different focus positions. Unadapted illumination leads to overexposed or underexposed regions in the individual acquired images that which are visible in the form of reflections or shadows in the image, for example. The stack of microscopic images taken from different focus positions is used to produce images with an extended depth of field or three-dimensional images.

SUMMARY

This object is achieved by a method according to enclosed claim 1 as well as by a digital microscope according to enclosed subsidiary claim 10.

The method according to the invention is used to acquire a stack of microscopic images of a specimen with a microscope, particularly with a digital microscope. An electronic image conversion takes place in the digital microscope. The microscope comprises an objective lens and an image sensor for converting an image reflected directly or indirectly from the objective lens onto the image sensor. The focus position or focal plane of the microscope can be changed manually or with an actuator, for which purpose the focusing of the microscope, particularly an acquisition distance or a focal length, can be varied. The acquisition distance between the specimen and the objective lens can be preferably varied by means of an actuator in the form of a motor. The variable focus position of the microscope can also be described as a variable z coordinate of the focus position or focal plane of the microscope.

The stack of microscopic images is composed of a number of microscopic images taken from different focus positions. The images preferably reproduce the same specimen or the same portion of the specimen. Apart from the focus position and illumination, the images are preferably captured using the same optical parameters of the microscope. The different focus positions are preferably constituted by different acquisition distances or by different focal lengths during the capturing of the images. The images of the stack differ from one another by the z coordinate of their acquisition, so that they can also be referred to as z-stacks.

According to the method, the microscopic images of the specimen are acquired from different focus positions in order to enable the image stack to be produced therefrom. In order to acquire the microscopic images of the specimen from different focus positions, the focus position is changed in each case either manually or with an actuator. The focus position is preferably changed over a spatial extension of the specimen without a change in a distance between the specimen and a lens of the microscope. The focus position is preferably changed by controlling a microsystem with movable mirrors or by controlling a deformable optical lens. Alternatively, the focus position is preferably changed by altering an acquisition distance or a focal length. The acquisition distance between the specimen and the objective lens is preferably changed by motorized means. The height of a stage carrying the specimen can be changed by means of a motor. Alternatively, the focus position is preferably changed manually. The focus position is preferably measured, preferably by means of a position sensor. The data of the measured focus position are preferably encoded and preferably stored together with data describing an illumination setting that is required for optimum quality of the microscopic image.

According to the invention, a plurality of the microscopic images of the specimen are respectively acquired from at least some of the different focus positions using different settings of an illumination unit for illuminating the specimen. Images are thus acquired from each of the focus positions in which the specimen is illuminated using different illumination settings, i.e., in which the specimen is illuminated differently. The respective illumination setting preferably comprises a selection of an illumination type, a selection of an illuminance, a selection of a single light source, and/or a selection of a direction of illumination. The respective illumination setting preferably comprises the selection of one or more illumination segments of the microscope illumination formed by segmented illumination. According to the invention, the illumination settings with which the microscopic images of the specimen are acquired is decided upon individually in each case at least for several of the focus positions. It is therefore preferable that the different illumination settings with which the microscopic images were acquired at one of the focus positions differ from the different illumination settings with which the microscopic images were acquired at another of the focus positions. The decision as to which illumination settings are used to acquire each of the microscopic images of the specimen is preferably applied with the aim of reducing reflections and/or shadows in the respective microscopic image. Therefore, this decision is preferably made such that the selected illumination setting results in minimum reflections and/or shadows in the respective microscopic image. This decision can be made manually, semi-automatically, or fully automatically.

A particular advantage of the method according to the invention is that the images acquired with different focus positions and using different illumination settings, each of which may have under- or overexposed regions, are in their totality suitable for generating an image in which under- or overexposed regions are avoided. A stack of microscopic images acquired from different focus positions can thus be generated in which under- or overexposed regions are avoided, thus enabling improved images with extended depth of focus or improved three-dimensional images to be produced from this stack.

The illumination settings with which the microscopic images of the specimen are acquired is preferably decided upon individually in each case at least for a plurality of the focus positions. The illumination settings with which the microscopic images of the specimen are acquired is preferably decided upon individually in each case for all of the focus positions.

Moreover, it is preferably decided with which illumination setting at least one microscopic image is acquired from an intermediate focus position located between two other of the plurality of focus positions. The illumination setting for the respective microscopic image with the intermediate focus position is preferably estimated on the basis of the previously determined illumination setting for the microscopic images with those focus positions between which the intermediate focus position is located. For this estimation, the previously determined illumination settings for the microscopic images with those focus positions between which the intermediate focus position is located are preferably averaged.

Preferably, the microscopic images of the specimen are acquired using different illumination settings from those focus positions with which overexposed and/or underexposed regions are present in one of the images acquired from the respective focus position. In this way, several images, each with one of the focus positions using different illumination settings, are only acquired if at least one of the images acquired from this focus position has overexposed and/or underexposed regions that are visible in the image—in the form of reflections or shadows, for example. The microscopic images of the specimen are preferably acquired using different illumination settings from those focus positions with which overexposed and/or underexposed regions are present in a first of the images acquired from the respective focus position. A plurality of images, each with one of the focus positions using different illumination settings, are only acquired if at least the first image acquired with this focus position has overexposed and/or underexposed regions.

To begin with, a first preferred embodiment of the method according to the invention comprises a step in which a first illumination setting for illuminating the specimen is applied. The first setting can comprise, inter alia, a selection of illumination types, a selection of illuminance levels, a selection of single light sources, and a selection of directions of illumination. A first set of the microscopic images is then acquired from the focus positions of a set of different focus positions and using the first illumination setting. This first set of microscopic images already represents a stack of microscopic images in which the microscopic images of the specimen were acquired from different focus positions. A microscopic image is thus taken for each of the focus positions of the set of different focus positions. The number of focus positions of the set of different focus positions corresponds to the number of microscopic images of the first set of microscopic images. In a next step of this first preferred embodiment, a second illumination setting for illuminating the specimen is applied that differs from the first setting. Like the first setting, the second illumination setting can comprise, inter alia, a selection of illumination types, a selection of illuminance levels, a selection of single light sources, and a selection of directions of illumination. A second set of the microscopic images is then acquired from the focus positions of the set of different focus positions and using the second illumination setting. A second stack of microscopic images is thus acquired in which the microscopic images of the specimen were acquired from different focus positions. The first set of microscopic images and the second set of microscopic images are thus acquired from the same focus positions but with different illumination settings.

In the first preferred embodiment of the method according to the invention, a third set of microscopic images is preferably also acquired. Accordingly, a third illumination setting for illuminating the specimen is first applied. The third set of microscopic images is then acquired from the focus positions of the set of different focus positions and using the third illumination setting. The first illumination setting, the second illumination setting, and the third illumination setting differ from one another. The first set of microscopic images, the second set of microscopic images, and the third set of microscopic images are thus acquired from the same focus positions but with different illumination settings.

In the first preferred embodiment of the method according to the invention, an additional set of microscopic images is preferably also acquired. Accordingly, an additional illumination setting for illuminating the specimen is first applied which differs from the other settings. The additional set of microscopic images is then acquired from the focus positions of the set of different focus positions and using the additional illumination setting. The sets of microscopic images are thus acquired from the same focus positions but with different illumination settings.

In the first preferred embodiment of the method according to the invention, at least four of the sets of microscopic images are preferably acquired.

A second preferred embodiment of the method according to the invention comprises a step in which a first illumination setting for illuminating the specimen is applied. The first setting can comprise, inter alia, a selection of illumination types, a selection of illuminance levels, a selection of single light sources, and a selection of directions of illumination. A first microscopic image of a first series of microscopic images is then acquired from a first focus position of a set of different focus positions and using the first illumination setting. In a subsequent step of the second preferred embodiment, a check is performed as to whether overexposed or underexposed regions are present in the first microscopic image of the first series of microscopic images. If no overexposed or underexposed regions are detected, then it is not necessary to acquire another microscopic image from this first focus position, so the first series comprises only the first microscopic image. However, if overexposed or underexposed regions are detected in the first microscopic image of the first series of microscopic images, then a second illumination setting is used to illuminate the specimen that is different from the first setting. A second microscopic image of the first series of microscopic images is then acquired from the first focus position of the set of different focus positions using the second illumination setting. The second illumination setting should avoid the overexposed or underexposed regions present in the first image of the first series of microscopic images. The first illumination setting for illuminating the specimen is then applied again, and a first microscopic image of a second series of microscopic images is acquired from a second focus position of the set of different focus positions using the first illumination setting. As with the first focus position, a check is performed as to whether overexposed or underexposed regions are present in the first microscopic image of the second series of microscopic images. If no overexposed or underexposed regions are detected, then it is not necessary to acquire another microscopic image from this second focus position. However, if overexposed or underexposed regions are detected in the first microscopic image of the second series of microscopic images, then the second illumination setting for illuminating the specimen is again applied. A second microscopic image of the second series of microscopic images is then acquired from the second focus position of the set of different focus positions using the second illumination setting.

In the second preferred embodiment of the method according to the invention, if the first microscopic image and the second microscopic image of one of the series of microscopic images have overexposed or underexposed regions despite the different illumination settings, a third microscopic image is preferably also acquired in the series of microscopic images in question. The second preferred embodiment of the method according to the invention preferably comprises additional steps for this purpose. In one of the additional steps, a check is performed as to whether overexposed or underexposed regions are present in the second microscopic image of the first series of microscopic images, insofar as the second microscopic image of the first series has been acquired. A third illumination setting for illuminating the specimen that is different from the first and second settings is applied if overexposed or underexposed regions have been detected in the second microscopic image of the first series of microscopic images. A third microscopic image of the first series of microscopic images is then acquired from the first focus position of the set of different focus positions using the third illumination setting. In an additional step, a check is performed as to whether overexposed or underexposed regions are present in the second microscopic image of the second series of microscopic images, insofar as the second microscopic image of the second series has been acquired. The third illumination setting for illuminating the specimen is applied if overexposed or underexposed regions have been detected in the second microscopic image of the second series of microscopic images. A third microscopic image of the second series of microscopic images is then acquired from the second focus position of the set of different focus positions using the third illumination setting.

In the second preferred embodiment of the method according to the invention, if the first microscopic image, the second microscopic image, and the third microscopic image of one of the series of microscopic images have overexposed or underexposed regions despite the different illumination settings, an additional microscopic image is preferably also acquired in the series of microscopic images in question. The second preferred embodiment of the method according to the invention preferably comprises additional steps for this purpose. In one of the additional steps, a check is performed as to whether overexposed or underexposed regions are present in the third microscopic image of the first series of microscopic images, provided that the third microscopic image of the first series has been acquired. An additional illumination setting for illuminating the specimen that is different from the other settings is applied if overexposed or underexposed regions have been detected in the third microscopic image of the first series of microscopic images. An additional microscopic image of the first series of microscopic images is then acquired from the first focus position of the set of different focus positions using the additional illumination setting. In an additional step, a check is performed as to whether overexposed or underexposed regions are present in the third microscopic image of the second series of microscopic images, provided that the third microscopic image of the second series has been acquired. The additional illumination setting for illuminating the specimen is applied if overexposed or underexposed regions have been detected in the third microscopic image of the second series of microscopic images. An additional microscopic image of the second series is then acquired from the second focus position of the set of different focus positions using the additional illumination setting.

Preferably, not only two series of microscopic images are acquired in each case, but rather also a third series and additional series. The second preferred embodiment of the method according to the invention preferably comprises additional steps for this purpose. The first illumination setting for illuminating the specimen is applied again. A first microscopic image of a third series of microscopic images is acquired from a third focus position of the set of different focus positions using the first illumination setting. A check is performed as to whether overexposed or underexposed regions are present in the first microscopic image of the third series of microscopic images. If overexposed or underexposed regions are detected in the first microscopic image of the third series of microscopic images, then the second illumination setting for illuminating the specimen is applied. A second microscopic image of the third series of microscopic images is then acquired from the third focus position of the set of different focus positions using the second illumination setting.

In the second preferred embodiment of the method according to the invention, an additional series of microscopic images is preferably also acquired, respectively. Accordingly, the first illumination setting for illuminating the specimen is applied again. A first microscopic image of the additional series of microscopic images is acquired from an additional focus position of the set of different focus positions using the first illumination setting. A check is performed as to whether overexposed or underexposed regions are present in the first microscopic image of the additional series of microscopic images. If overexposed or underexposed regions are detected in the first microscopic image of the additional series of microscopic images, then the second illumination setting for illuminating the specimen is applied. A second microscopic image of the additional series of microscopic images is then acquired from the additional focus position of the set of different focus positions using the second illumination setting.

In the second preferred embodiment of the method according to the invention, if the first microscopic image and the second microscopic image of the third or of one of the additional series of microscopic images have overexposed or underexposed regions despite the different illumination settings, a third microscopic image and, preferably, an additional microscopic image is preferably also acquired in the series of microscopic images in question, as was already described above.

In the method according to the invention, the microscopic images acquired from one of the respective focus positions and using different illumination settings are preferably converted into a single microscopic image representing the respective focus position in order to replace at least one of the detected overexposed or underexposed regions with a region that is not overexposed or underexposed. The microscopic images acquired from one of the respective focus positions and using different illumination settings are preferably converted into a single microscopic image representing the respective focus position in order to replace all of the detected overexposed and underexposed regions with a respective region that is not overexposed or underexposed. The microscopic image representing the respective focus position forms one of the microscopic images of the stack of microscopic images captured from different focus positions to be acquired. Each of the stacks of microscopic images acquired from the different focus positions preferably comprises exactly one microscopic image per focus position that was acquired directly from this focus position or formed from a plurality of microscopic images that were acquired directly from this focus position.

The stack of microscopic images acquired from the different focus positions is preferably used to produce an image with an extended depth of field.

For this purpose, each of the individual microscopic images of the stack is used to convert, by calculation, the sharply imaged regions into a single image with an extended depth of field, so that a mostly artificially sharp image of several depth-of-field levels of the specimen can be produced in comparison to individual microscopic images having a comparatively small depth of focus.

The stack of microscopic images acquired from the different focus positions is preferably used to produce a three-dimensional image.

For this purpose, depth information is obtained from the microscopic images acquired from different focus positions.

To begin with, the digital microscope according to the invention comprises an objective lens for the enlarged optical imaging of a specimen. The objective lens comprises optical components for enlarged optical imaging of the specimen on an image plane. The optical components are particularly instantiated by optical lenses and optionally also by one or more mirrors, shutters, and filters. The microscope according to the invention further comprises an image sensor for converting the image reflected directly or indirectly on the image sensor by the objective lens into an electrical signal. The digital microscope according to the invention further comprises an illumination unit for illuminating the specimen.

The microscope according to the invention comprises a means for changing a focus position of the microscope. The means is preferably instantiated by a manually operated adjusting element. The adjusting element is preferably designed to be able to manually change a distance between a specimen and the objective lens. Alternatively, the means is preferably an actuator. In simple embodiments, the actuator is preferably designed to change a distance between a specimen and the objective lens. For this purpose, the actuator preferably comprises an electric motor for moving a specimen stage carrying the specimen or for moving the objective lens. The actuator is preferably designed to change a focal length of the objective lens. The actuator is preferably used to actuate an active optical element with which the focus can be adjusted. Especially preferably, the actuator of the active optical element is a microsystem for mechanically moving micromirrors and/or microlenses. The micromirrors preferably form a lens, particularly a Fresnel lens. By changing the position of the micromirrors, the focal length of the Fresnel lens can be changed very quickly. This quick changing of the focal length enables the focus position to be adjusted very quickly. As a preferred alternative, the actuator is designed to deform a deformable optical lens.

The microscope according to the invention comprises an electronic control unit for controlling the illumination and preferably also for controlling the actuator. The control unit is configured to carry out the method according to the invention. The control unit is preferably configured to carry out preferred embodiments of the method according to the invention. Moreover, the microscope preferably also has features that are specified in connection with the method according to the invention and its preferred embodiments.

The microscope according to the invention is preferably designed to measure the focus position and/or the setting of the actuator in order to obtain measurement data about same. The microscope according to the invention is preferably further designed to transmit, acquire, and/or store the measurement data. The microscope according to the invention is preferably also designed to measure, transmit, acquire, and/or store data describing the actuation of the actuator for changing the focus position.

BRIEF DESCRIPTION OF THE DRAWINGS

Additional details and developments of the invention follow from the following description of preferred exemplary embodiments of the invention with reference to the drawing. In the drawing.

DETAILED DESCRIPTION

Figure 1:
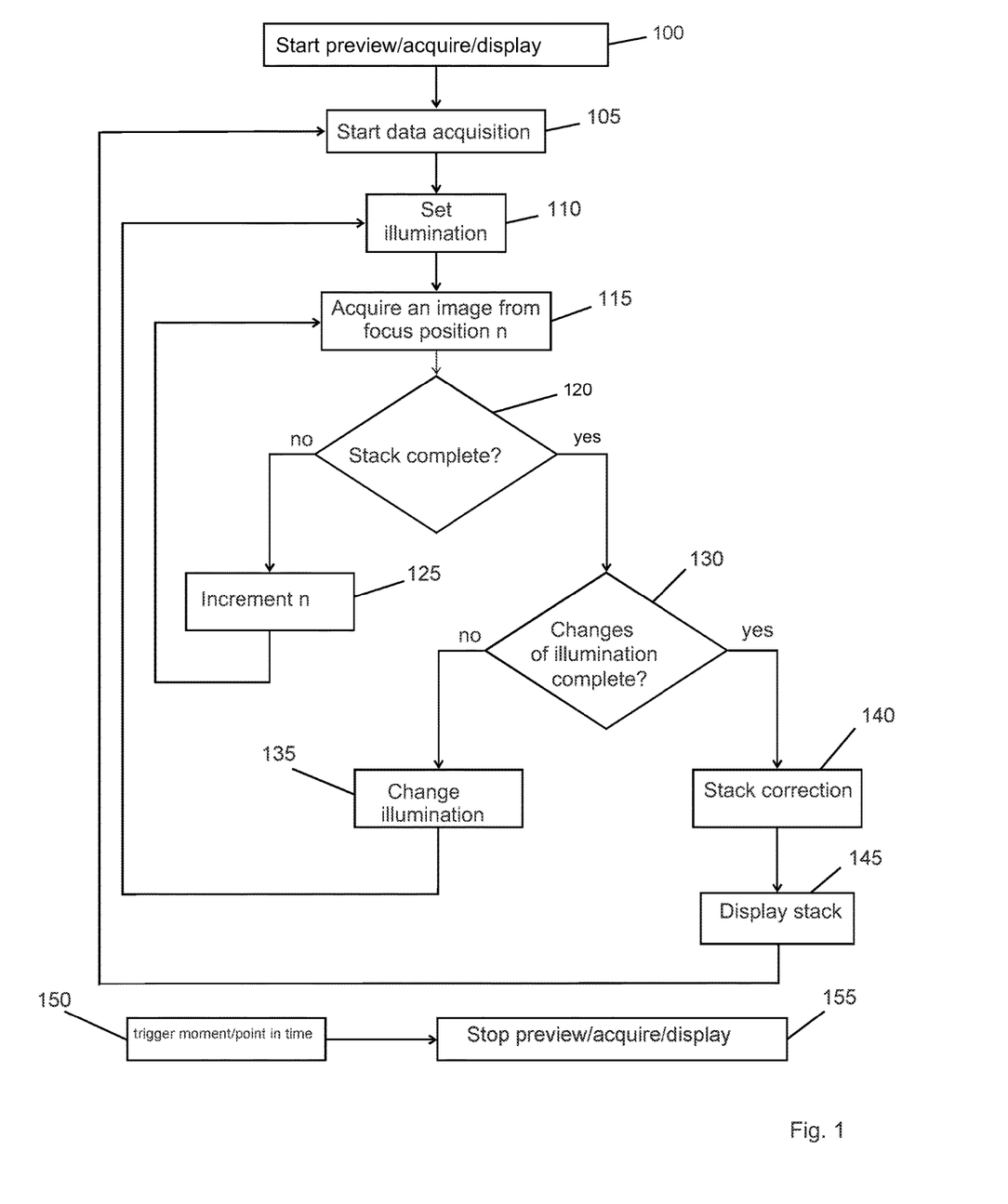
FIG. 1 shows a flowchart of a first preferred embodiment of a method according to the invention.

FIG. 1 shows a flowchart of a first preferred embodiment of a method according to the invention for acquiring a stack of microscopic images of a specimen with a digital microscope. The process sequence begins with a "Start preview/acquire/display" step 100 in which previewing and displaying of the microscopic images to be acquired is initiated. In a subsequent "Start data acquisition" step 105, processes for the acquisition of the microscopic images to be acquired are initiated. In a "Set illumination" step 110, a first setting of an illumination unit of the digital microscope for illuminating the specimen to be microimaged is applied. In a subsequent "Acquire an image from focus position n" step 115, a first microscopic image of the specimen is acquired with the digital microscope, starting with n=1, with the specimen being illuminated using the first setting of the specimen, and with a first focus position being set on the digital microscope. The stack to be acquired should thus comprise a plurality of microscopic images that were captured from different focus positions, with the number of microscopic images to be produced being equal to 10, for example. After the microscopic image has been acquired, a "Stack complete?" query 120 is carried out in which a check is performed as to whether the number of microscopic images to be produced has already been reached with the last acquired microscopic image. If this is not the case, then the counter n is increased by one in an "Increment n" step 125 and the "Acquire an image from focus position n" step 115 is carried out again. If the following check showed that the number of microscopic images to be produced was reached with the last acquired microscopic image, a "Changes to illumination complete?" query 130 is carried out. This query checks whether a predefined number of different illumination settings has already been reached. For example, it can be defined in advance that the various microscopic images of the stack are to be acquired using two, four, or eight different illumination settings. After the first n microscopic images have been acquired using the first illumination setting, the check shows that the predefined number of different illumination settings has not yet been reached. This negative result of the check has the effect that, in an additional "Change illumination" step 135, a second illumination setting is selected, so that the specimen is now illuminated in a different way, with previously shaded regions of the specimen now being illuminated, for example. For this purpose, the "Set illumination" step 110 is carried out again, whereupon the second n microscopic images are acquired using the second illumination setting, with a decision being made individually at least for several of the n focus positions whether a microscopic image is acquired using the respective illumination setting. As soon as n microscopic images have been acquired for the predefined number of different illumination settings, the "Changes to illumination complete?" query 130 will yield a positive result. Then, in a "Stack correction" step 140, those microscopic images that were acquired from the same focus position but using the different illumination settings are merged into a single microscopic image. During this merging process, the aim is to use only correctly exposed portions of the individual microscopic images for the merged image. As a result, n merged images of the stack are present that are displayed in a "Display stack" step 140, whereupon the "Start data acquisition" step 105 restarts the process sequences for capturing the microscopic images to be acquired.

In a "Trigger Moment/Point in Time" step 150, the process is aborted automatically, semi-automatically, or by a user, so that in a "Stop preview/acquire/display" step 155, the previewing, acquiring, and displaying of the microscopic images is terminated.

Figure 2:
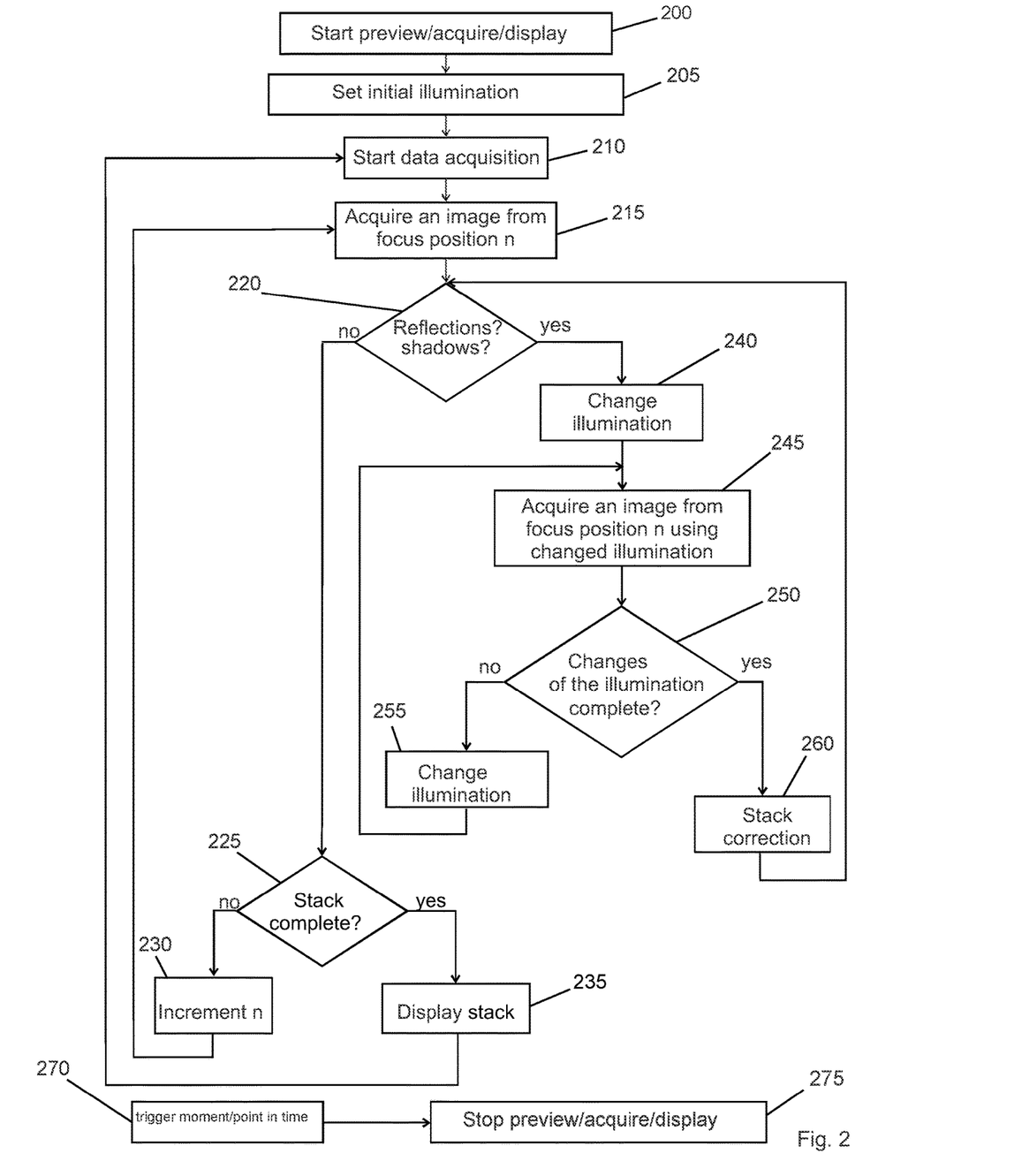
FIG. 2 shows a flowchart of a second preferred embodiment of the method according to the invention.

FIG. 2 shows a flowchart of a second preferred embodiment of the method according to the invention for acquiring a stack of microscopic images of a specimen with a digital microscope. The process sequence begins with a "Start preview/acquire/display" step 200 in which previewing and displaying of the microscopic images to be acquired is initiated. In a "Set initial illumination" step 205, a first setting of an illumination unit of the digital microscope for illuminating the specimen to be microimaged is applied, which can be done manually, automatically, or according to a preset. In a subsequent "Start data acquisition" step 210, processes for the acquisition of the microscopic images to be acquired are initiated. In a subsequent "Acquire an image from focus position n" step 215, a first microscopic image of the specimen is acquired with the digital microscope, starting with n=1, with the specimen being illuminated using the first setting of the specimen, and with a first focus position being set on the digital microscope. The stack to be acquired should thus comprise a plurality of microscopic images that were captured from different focus positions, with the number of microscopic images to be produced being equal to 10, for example. After the microscopic image has been acquired, a "Reflections? Shadows?" query 220 is carried out in which a check is performed as to whether there are shadows, reflections, or other defective image regions in the last acquired microscopic image that were caused by overexposure or underexposure. If the result of this query is positive, at least one additional microscopic image is required that was captured from the first focus position but using a different illumination setting. In this case, in an additional "Change illumination" step 240, a second illumination setting is selected, so that the specimen is now illuminated in a different way, with previously shaded regions of the specimen now being illuminated, for example. In an additional "Acquire image with the focus position n using changed illumination" step 245, a microscopic image is acquired using the changed illumination setting but still from the first focus position. Subsequently, a "Changes to illumination complete?" query 250 is performed. This query checks whether a predefined number of different illumination settings has already been reached. If the check shows that the predefined number of different illumination settings has not yet been reached, then a third illumination setting is selected in an additional "Change illumination" step 255. Subsequently, the "Acquire an image from focus position n using changed illumination" step 245 is carried out again. After the "Changes to illumination complete?" query 250 that then follows again, additional changes to the illumination settings are made if the predefined number of different illumination settings has not yet been reached. As soon as the predefined number of different illumination settings has been reached, the microscopic images acquired from the same focus position and using different illumination settings are merged in a "Stack correction" step 260 to form a microscopic image. During this merging process, the aim is to use only correctly exposed portions of the individual microscopic images for the merged image. The "Reflections? Shadows?" query 220 is then carried out again.

Is the result of the "Reflections? Shadows?" query 220 is negative, then there is no need for an additional microscopic image that was taken from the respective focus position. In this case, a "Stack complete?" query 225 is carried out in which a check is performed as to whether the number of microscopic images to be produced has already been reached with the last acquired microscopic image. If this is not the case, then the counter n is increased by one in an "Increment n" step 230 and the "Acquire an image from focus position n" step 215 is carried out again. As soon as the number of microscopic images to be produced has been reached with the last acquired microscopic image that are displayed in a "Display stack" step 235, the "Start data acquisition" step 210 restarts the process sequences for capturing the microscopic images to be acquired.

In a "Trigger Moment/Point in Time" step 270, the process is aborted automatically, semi-automatically, or by a user, so that in a "Stop preview/acquire/display" step 275, the previewing, acquiring, and displaying of the microscopic images is terminated.

Figure 3:
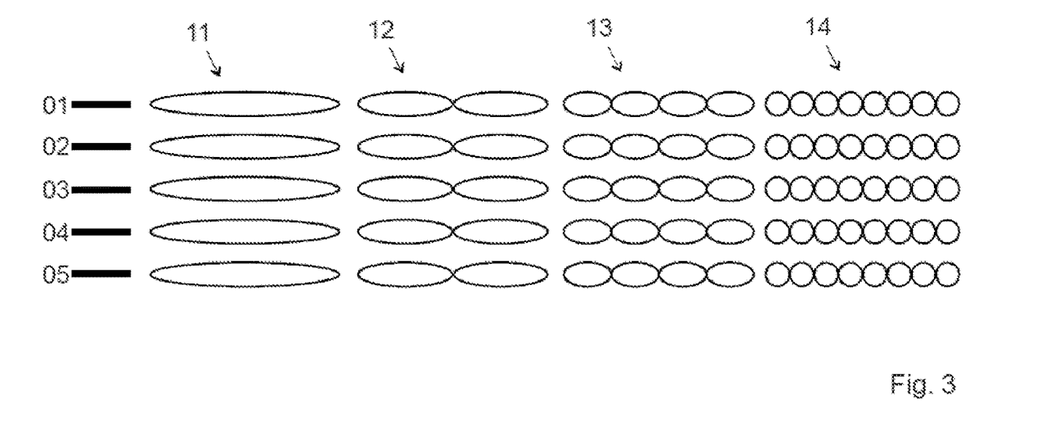
FIG. 3 shows a schematic illustrating focus positions to be used according to the invention and different settings of an illumination unit.

FIG. 3 shows a schematic illustrating focus positions 01, 02, 03, 04, 05 to be used according to the invention, the number of which is five for the sake of example. Each of the five focus positions 01, 02, 03, 04, 05 can be associated with different settings 11, 12, 13, 14 of an illumination unit for illuminating a specimen to be microimaged. The first setting 11, for example, results in a distribution of the light at a single aperture angle, which can be achieved by means of a non-segmented ring light, for example. The second setting 12 represents, for example, two statuses of different aperture angles of the light propagation that can be achieved by means of a ring light with two segments, for example. The third setting 13 represents, for example, four statuses of different aperture angles of the light propagation that can be achieved by means of a ring light with four segments, for example, with the two respective opposing segments lighting up simultaneously. The fourth setting 14 represents, for example, eight statuses of different aperture angles of the light propagation that can be achieved by means of an eight-segment ring light, for example, with the segments being capable of lighting up individually.

The extent to which reflections and/or shadows in the microscopic images are avoided according to the invention increases starting from the first to the fourth settings 11, 12, 13, 14. Likewise, the speed at which the microscopic images are acquired decreases from the first to the fourth settings 11, 12, 13, 14.

Figure 4:
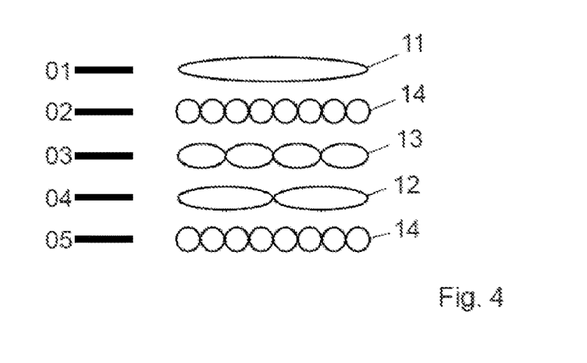
FIG. 4 shows the focus positions shown in FIG. 3 with associated illumination settings according to an exemplary embodiment of the method according to the invention.

FIG. 4 shows the focus positions 01, 02, 03, 04, 05 shown in FIG. 3 with associated illumination settings 11, 12, 13, 14 according to an exemplary embodiment of the method according to the invention. The illumination settings 11, 12, 13, 14 are selected for each of the focus positions 01, 02, 03, 04, 05 in such a way that reflections and/or shadows in the microscopic images to be acquired are avoided.

LIST OF REFERENCE SYMBOLS

01—first focus position
02—second focus position
03—third focus position
04—fourth focus position
05—fifth focus position
06—-
07—-
08—-
09—-
10—-
11—first illumination setting
12—second illumination setting
13—third illumination setting
14—fourth illumination setting

The invention claimed is:

1. A method for acquiring a stack of microscopic images of a specimen, the method comprising the steps of:
acquiring microscopic images of the specimen from different focus positions, wherein a plurality of the microscopic images of the specimen are respectively acquired from each of at least some of the different focus positions
the acquiring including applying different illumination settings of an illumination unit for illuminating the specimen at each of at least some of the different focal positions, wherein the illumination settings with which the microscopic images of the specimen are acquired are determined individually in each case at least for several of the focus positions; wherein the acquiring further includes:
applying a first setting of the illumination unit for illuminating the specimen;
acquiring a first set of microscopic images from the focus positions of a set of different focus positions using the first illumination setting;
applying a second setting of the illumination unit for illuminating the specimen; and
acquiring a second set of microscopic images from focus positions of the set of different focus positions using the second illumination setting.

2. The method as set forth in claim 1, wherein the microscopic images of the specimen are acquired using different illumination settings from those focus positions with which overexposed and/or underexposed regions are present in one of the images acquired from the respective focus position.

3. The method as set forth in claim 1, wherein the respective illumination setting preferably comprises the selection of one or more illumination segments of the microscope illumination formed by segmented illumination.

4. The method as set forth in claim 1, wherein the focus position is changed over a spatial extension of the specimen without changing a distance between the specimen and an objective lens or by changing an acquisition distance between the specimen and an objective lens.

5. The method as set forth in claim 1, wherein the method comprises the following additional steps:
applying a third setting of the illumination unit for illuminating the specimen; and
acquiring a third set of microscopic images from focus positions of the set of different focus positions using the third illumination setting.

6. A method for acquiring a stack of microscopic images of a specimen, the method comprising the steps of:
acquiring microscopic images of the specimen from different focus positions, wherein a plurality of the microscopic images of the specimen are respectively acquired from each of at least some of the different focus positions
the acquiring including applying different illumination settings of an illumination unit for illuminating the specimen at each of at least some of the different focal positions, wherein the illumination settings with which the microscopic images of the specimen are acquired are determined individually in each case at least for several of the focus positions; the acquiring further including:
applying a first setting of the illumination unit for illuminating the specimen;
acquiring a first microscopic image of a first series of microscopic images from the first focus position of a set of different focus positions using the first illumination setting;
checking whether overexposed or underexposed regions are present in the first microscopic image of the first series of microscopic images;
applying a second setting of the illumination unit for illuminating the specimen if overexposed or underexposed regions have been detected in the first microscopic image of the first series of microscopic images;
acquiring a second microscopic image of the first series of microscopic images from the first focus position of the set of different focus positions using the second illumination setting;
applying the first setting of the illumination unit for illuminating the specimen;
acquiring a first microscopic image of a second series of microscopic images from the second focus position of the set of different focus positions using the first illumination setting;
checking whether overexposed or underexposed regions are present in the first microscopic image of the second series of microscopic images;

applying the second setting of the illumination unit for illuminating the specimen if overexposed or underexposed regions have been detected in the first microscopic image of the second series of microscopic images; and acquiring a second microscopic image of the second series of microscopic images from the second focus position of the set of different focus positions using the second illumination setting.

7. The method as set forth in claim 6, wherein the method comprises the following additional steps:

checking whether overexposed or underexposed regions are present in the second microscopic image of the first series of microscopic images;

applying a third setting of the illumination unit for illuminating the specimen if overexposed or underexposed regions have been detected in the second microscopic image of the first series of microscopic images;

acquiring a third microscopic image of the first series of microscopic images from the first focus position of the set of different focus positions using the third illumination setting checking whether overexposed or underexposed regions are present in the second microscopic image of the second series of microscopic images;

applying the third setting of the illumination unit for illuminating the specimen if overexposed or underexposed regions have been detected in the second microscopic image of the second series of microscopic images; and acquiring a third microscopic image of the second series of microscopic images from the third focus position of the set of different focus positions using the third illumination setting.

8. The method as set forth in claim 2, wherein the microscopic images acquired from one of the respective focus positions and using different illumination settings are preferably converted into a single microscopic image representing the respective focus position in order to replace at least one of the detected overexposed or underexposed regions with a region that is not overexposed and not underexposed.

9. The method as set forth in claim 2, wherein the focus position is changed over a spatial extension of the specimen without changing a distance between the specimen and an objective lens or by changing an acquisition distance between the specimen and an objective lens.

10. The method as set forth in claim 3, wherein the focus position is changed over a spatial extension of the specimen without changing a distance between the specimen and an objective lens or by changing an acquisition distance between the specimen and an objective lens.

11. The method as set forth in claim 4, wherein the method further comprises the following steps:

applying a first setting of the illumination unit for illuminating the specimen;

acquiring a first set of microscopic images from the focus positions of a set of different focus positions using the first illumination setting;

applying a second setting of the illumination unit for illuminating the specimen; and acquiring a second set of microscopic images from focus positions of the set of different focus positions using the second illumination setting.

12. The method as set forth in claim 3, wherein the method comprises the following steps:

applying a first setting of the illumination unit for illuminating the specimen;

acquiring a first microscopic image of a first series of microscopic images from the first focus position of a set of different focus positions using the first illumination setting;

checking whether overexposed or underexposed regions are present in the first microscopic image of the first series of microscopic images;

applying a second setting of the illumination unit for illuminating the specimen if overexposed or underexposed regions have been detected in the first microscopic image of the first series of microscopic images;

acquiring a second microscopic image of the first series of microscopic images from the first focus position of the set of different focus positions using the second illumination setting;

applying the first setting of the illumination unit for illuminating the specimen;

acquiring a first microscopic image of a second series of microscopic images from the second focus position of the set of different focus positions using the first illumination setting;

checking whether overexposed or underexposed regions are present in the first microscopic image of the second series of microscopic images;

applying the second setting of the illumination unit for illuminating the specimen if overexposed or underexposed regions have been detected in the first microscopic image of the second series of microscopic images; and acquiring a second microscopic image of the second series of microscopic images from the second focus position of the set of different focus positions using the second illumination setting.

13. The method as set forth in claim 4, wherein the method comprises the following steps:

applying a first setting of the illumination unit for illuminating the specimen;

acquiring a first microscopic image of a first series of microscopic images from the first focus position of a set of different focus positions using the first illumination setting;

checking whether overexposed or underexposed regions are present in the first microscopic image of the first series of microscopic images;

applying a second setting of the illumination unit for illuminating the specimen if overexposed or underexposed regions have been detected in the first microscopic image of the first series of microscopic images;

acquiring a second microscopic image of the first series of microscopic images from the first focus position of the set of different focus positions using the second illumination setting;

applying the first setting of the illumination unit for illuminating the specimen;

acquiring a first microscopic image of a second series of microscopic images from the second focus position of the set of different focus positions using the first illumination setting;

checking whether overexposed or underexposed regions are present in the first microscopic image of the second series of microscopic images;

applying the second setting of the illumination unit for illuminating the specimen if overexposed or underexposed regions have been detected in the first microscopic image of the second series of microscopic images; and acquiring a second microscopic image of the second series of microscopic images from the second focus position of the set of different focus positions using the second illumination setting.

* * * * *